(12) United States Patent
Schmidt et al.

(10) Patent No.: US 9,074,946 B2
(45) Date of Patent: Jul. 7, 2015

(54) PROTECTIVE TUBE INNER PART FOR A THERMOMETER WITH A PROTECTIVE TUBE

(75) Inventors: Dieter Schmidt, Nesselwang (DE); Peter Seefeld, Pfronten (DE); Alfred Umkehrer, Hopferau (DE); Wilfried Meissner, Pfronten (DE); Helmut Kalteis, Marktoberdorf (DE)

(73) Assignee: ENDRESS + HAUSER WETZER GMBH + CO. KG, Nesselwang (DE)

(*) Notice: Subject to any disclaimer, the term of this patent is extended or adjusted under 35 U.S.C. 154(b) by 464 days.

(21) Appl. No.: 13/314,417

(22) Filed: Dec. 8, 2011

(65) Prior Publication Data

US 2012/0147923 A1    Jun. 14, 2012

Related U.S. Application Data

(60) Provisional application No. 61/424,716, filed on Dec. 20, 2010.

(30) Foreign Application Priority Data

Dec. 14, 2010   (DE) .................. 10 2010 063 062

(51) Int. Cl.
 *G01K 1/08*   (2006.01)
 *G01K 1/16*   (2006.01)
 *G01K 13/02*  (2006.01)

(52) U.S. Cl.
 CPC .. *G01K 1/16* (2013.01); *G01K 1/08* (2013.01); *G01K 13/02* (2013.01)

(58) Field of Classification Search
 CPC ............... G01J 5/12; G01K 1/18; G01K 7/02; G01K 1/12; G01K 13/02; G01K 1/08; G01K 13/00; G01K 1/16; G01T 3/00

USPC ............ 374/179, 158, 120, 121, 208–209, 374/139–142, 148, 100, 163; 600/184; 73/866.5; 136/228, 230, 232–234; 266/88; 250/390
 See application file for complete search history.

(56) References Cited

U.S. PATENT DOCUMENTS 2,190,384 A * 2/1940 Newman ................. 607/105
4,411,537 A   10/1983 Grimm
(Continued)

FOREIGN PATENT DOCUMENTS

DE       576734      5/1933
DE      1118996     12/1961
(Continued)

OTHER PUBLICATIONS

International Search Report, EPO, The Netherlands, Mar. 1, 2012.
(Continued)

*Primary Examiner* — Gail Kaplan Verbitsky
(74) *Attorney, Agent, or Firm* — Bacon & Thomas, PLLC (57) ABSTRACT

A thermometer with protective tube inner part for insertion into a protective tube, especially a protective tube of a thermometer, wherein the protective tube inner part serves for arranging conductor elements, and wherein the protective tube inner part is matched to the shape of the inside of the protective tube in the region of a closed, protective tube end, and wherein the protective tube inner part serves to arrange the conductor elements on the side of the protective tube inner part facing the protective tube in the installed state.

21 Claims, 6 Drawing Sheets

(56) References Cited

U.S. PATENT DOCUMENTS

| | | | |
|---|---|---|---|
| 6,676,290 B1* | 1/2004 | Lu | 374/163 |
| 6,979,121 B2 | 12/2005 | Chang et al. | |
| 7,439,845 B2 | 10/2008 | Houben et al. | |
| 7,806,587 B2 | 10/2010 | Kobayashi | |
| 8,424,327 B2* | 4/2013 | Nishide et al. | 62/214 |
| 2003/0198278 A1* | 10/2003 | Yu | 374/208 |
| 2004/0071190 A1 | 4/2004 | Chang | |
| 2004/0071191 A1 | 4/2004 | Sim et al. | |
| 2006/0115660 A1 | 6/2006 | Strangman et al. | |
| 2007/0030880 A1* | 2/2007 | Smith et al. | 374/208 |

FOREIGN PATENT DOCUMENTS

| | | |
|---|---|---|
| DE | 7104418 | 7/1974 |
| DE | 859066 | 8/1979 |
| DE | 7911898 | 8/1979 |
| DE | 8108694 U1 | 3/1981 |
| DE | 3330491 C2 | 3/1985 |
| DE | 3721983 A1 | 1/1989 |
| DE | 3811825 A1 | 10/1989 |
| DE | 4123093 A1 | 1/1993 |
| DE | 4138460 C2 | 5/1993 |
| DE | 19707844 A1 | 9/1998 |
| DE | 2030254 U1 | 6/2003 |
| DE | 20302054 U1 | 6/2003 |
| DE | 202004001670 U1 | 5/2004 |
| DE | 102006034246 B3 | 11/2007 |
| EP | 1831504 B1 | 9/2007 |
| GB | 2147737 A | 5/1985 |
| JP | 7-501144 A | 2/1995 |

OTHER PUBLICATIONS

English translation of IPR, WIPO, Geneva, Jun. 27, 2013 (in English).
German Search Report.
English translation of Chinese Office Action dated Jun. 3, 2014, for CN 201180060290.3.

\* cited by examiner

PROTECTIVE TUBE INNER PART FOR A THERMOMETER WITH A PROTECTIVE TUBE

CROSS-REFERENCE TO RELATED APPLICATION

This application is a nonprovisional which claims the benefit of U.S. Provisional Application No. 61/424,716 which was filed on Dec. 20, 2011.

TECHNICAL FIELD

The invention relates to a protective tube inner part for insertion into a protective tube, especially a protective tube of a thermometer, wherein the protective tube inner part serves for arranging conductor elements, and wherein the protective tube inner part is matched to the shape of the inside of the protective tube in the region of a closed, protective tube end. Additionally, the invention relates to a thermometer with such a protective tube inner part, as well as to a container, on which such a thermometer is placeable. Furthermore, the invention relates to a system composed of a thermometer and a pouch, or container, with a flexible wall

BACKGROUND DISCUSSION

Known from the state of the art are numerous thermometers that have a protective tube inner part as described above. Thus, such thermometers have a protective tube, into which a sensor, also called a measuring transducer, can be inserted. The thermometer can be, in such case, a temperature sensor, for example, in the form of a thermoelement, such as a thermocouple, or a temperature dependent, resistance element. Known from the state of the art are, additionally, thermometers, in the case of which the measuring transducer is part of a measuring insert, especially a replaceable measuring insert, which is arranged in the protective tube. The measuring insert is composed, in such case, of a protective tube inner part and the measuring transducer, wherein the protective tube inner part serves, among other things, as the holder of the measuring transducer. The protective tube itself serves, in such case, often as protection against, for example, an abrasive, measured material and is inserted into a containment, such as, for example, a tank or a pipe, in which the measured material is located. Such thermometers intended for use in an industrial environment are sold by the firm, ENDRESS+HAUSER ®.

Problematic in the case of such construction is, however, heat transfer between the process and the process environment brought about by the thermometer. Measurement error can result from this. Known from the state of the art is to resist this heat transfer by using, for example, a long installation depth, i.e. a long protective tube length.

Thus, for example, patent DE 102006034246 B3 describes a temperature sensor for a resistance thermometer, which has a metal jacket and is filled with ceramic or mineral material. This resistance thermometer has, however, a considerable thermal drain effect, which can lead to a defective temperature measurement.

Patent DE 19707844 A1 provides external design elements, with which sensor connection lines can be heated or cooled, in order to avoid measurement error arising from thermal drain. The proposed measures require, however, the use of auxiliary energy.

Patent DE 4123093 C2 describes a thermometer constructed of corrosion resistant materials, such as glass, with pressure- and corrosion resistant feedthroughs, wherein a provided assembly head, however, interferes with evacuation of the protective tube volume. Likewise, utility model DE 8108694 U1 discloses a non evacuable thermometer for measuring surface temperatures. The construction proposed in the aforementioned documents leads, moreover, to increased heat transfer, i.e. heat transfer via the protective tube and the measuring insert into the environment of the process. Furthermore, such construction exhibits only poor thermal response to temperature changes in the process.

Utility model DE 7911898 U1 describes a non evacuable measuring gauge, which uses metal insert parts and, consequently, likewise tends to exhibit thermal drain.

Laid open DE 1118996 relates to a thermometer, which has a glass feedthrough containing a bore and serving as insulation piece. This thermometer uses a pressure-resistant protective tube with neck tube and screw fittings and has a measuring gauge, which is embedded in synthetic resin and therewith also tends to exhibit thermal drain.

Patent DE 859066 discloses a heat insulating guide, on which a spring abuts, wherein thermal contact should be achieved by means of pressure against the measuring element, wherein, however, also here, thermal drain effects are present due to the utilized materials.

Patent DE 3721983 A1 discloses an immersion thermometer, in the case of which sufficient thermal contact with the measured medium can be achieved exclusively through a long installation depth.

Patent DE 4138460 C2 describes an evacuable thermometer, which, however, uses a thermally draining, internal holder. The volume surrounded by the protective tube is, indeed, evacuable, but the proposed holder of transparent ceramic produces thermal drain that disturbs the measuring.

Provided in Patent EP 1831504 B1 are thermally insulating layer arrangements, which, however, also tend to exhibit thermal drain.

Patent DE 3330491 C2 describes a thermocouple with two wires accommodated with tension relief in a protective sleeve. The wires are of different materials, such as, for example, iron and constantan, which are connected conductively together at the end toward the measuring point to form a thermocouple and, at least in the region of the measuring point, are surrounded by a cup of heat resistant material. However, thermal drain occurs also in the case of this construction.

Patent DE 576734 utilizes a needle shaped thermocouple, wherein therocouples in the form of hollow needles are provided, which have, however, only limited mechanical strength and their thermal drain characteristic presupposes an immersion depth amounting to at least 6-times the probe diameter.

SUMMARY OF THE INVENTION

An object of the invention, thus, is to improve thermal contact of a thermometer with a process and simultaneously to lessen heat transfer, and, therewith, heat transfer error, of the thermometer.

The object is achieved by a protective tube inner part, a thermometer, a container with such a thermometer, and a system comprising a thermometer and a pouch and, respectively, a container.

The object is achieved as regards the protective tube inner part of the invention by the features that the protective tube inner part serves to arrange the conductor elements on the side of the protective tube inner part facing the protective tube in the installed state. In this way, the conductor elements come into better thermal contact with the protective tube and therewith the temperature to be determined for a measured material, or the temperature of a process. In contrast therewith, in the case of the measuring inserts and protective tube inner parts known from the state of the art, the conductor elements are led at least partially within the measuring insert and emerge from the measuring insert or the protective tube inner part and thermally into contact with the protective tube only in the region of the measuring point, where, for example, a temperature dependent, resistance element or the junction of a thermocouple is arranged. Through the proposed protective tube inner part, the conductor elements are, however, preferably, at least in a subsection, and especially in the total region, in which the conductor elements are led by the protective tube inner part, led between the protective tube inner part and the protective tube, such that they are thus arranged in the installed state on the side of the protective tube inner part facing the protective tube. In this way, there come at least sectionally in thermal contact with the protective tube not only the, on occasion, present, measuring point but also the conductor elements, which serve as connection lines to the measuring point, where the sensor, or measuring transducer is located.

Preferably, according to a form of embodiment of the invention, the conductor elements are in the total region, in which they come in contact with the protective tube inner part, or are arranged and/or led through such, arranged or led on the outside of the protective tube inner part, i.e. the side in the installed state facing the protective tube, more exactly, the inside of the protective tube. The protective tube can, in such case, be, for example, of a metal material, especially a stainless steel, which is preferably formed by a deep draw method.

Additionally, an option is that the conductor elements are arranged only along a subregion by the protective tube inner part on the side of the protective tube inner part facing the protective tube in the installed state, especially along the longitudinal axis of the protective tube inner part or of the protective tube, which subregion serves for accommodating the conductor elements, in order to position the conductor elements in a predetermined arrangement. For example, an option is that the conductor elements are partially, such as, for example, known from the state of the art, led first within the protective tube inner part. Alternatively, the conductor elements can be led at least partially on an inside of the protective tube inner part, before they are led through the protective tube inner part and arranged on the outside of the protective tube inner part, thus the side of the protective tube inner part facing the protective tube in the installed state.

The protective tube inner part is, in such case, so embodied that it is introducible into a hollow space formed by the protective tube. The hollow space is, in such case, bounded, for example, by the inside of the protective tube or by a potting compound or a coating applied to the inside of the protective tube, at least in a subregion thereof. Moreover, the protective tube inner part can, as already mentioned, be matched to the shape of the inside of the protective tube at least in the region of the closed end of the protective tube. Because the shape of the protective tube inner part is matched, at least on its outside, to the shape of the inside of the protective tube and the conductor elements are arranged on the outside of the protective tube inner part, the conductor elements can be brought into thermal contact with the protective tube. Additionally, thereby, also faster response times to temperature changes in the process can be achieved, this being especially advantageous in the case of a temperature sensor of a thermometer.

Preferably, the conductor elements are, for example, so arranged by the protective tube inner part that they lie approximately in a plane, at least in the region, in which they come in contact with the protective tube inner part or are arranged by the protective tube inner part. Lying in a plane means, in such case, that the curves formed by the routes of the conductor elements lie in a plane. Preferably, the conductor elements are, in such case, so arranged that they extend toward on one another from opposing directions, especially along the wall of the protective tube. In such case, they can be arranged in the aforementioned arrangement by the protective tube inner part and/or by the protective tube. The conductor elements can in a spatial section adjoining the spatial section along the longitudinal axis, in which the protective tube inner part is arranged, i.e. before the conductor elements are arranged by the protective tube inner part, extend within the hollow space formed by the protective tube, at least sectionally parallel to one another or, especially, tension relieved and loosely in the protective tube.

In an embodiment of the protective tube inner part, the protective tube inner part has a cup-like shape. The protective tube inner part has accordingly preferably a thickness, which in comparison to the remaining dimensions of the protective tube inner part is small(er). The protective tube inner part, especially the cup-like protective tube inner part, can thus be a piece, which is formed corresponding to the inside of the protective tube. The protective tube inner part can, additionally, have, at least sectionally, a spherical cup-like and/or conical cup-like shape. Preferably, the cup-like shape of the protective tube inner part fits the shape of the protective tube on the inside of the protective tube; in short, it fits the inside of the protective tube. The surface of the protective tube inner part matched to the inside of the protective tube forms its outside, i.e. the protective tube inner part is, at least on its outside, matched to the inside of the protective tube. Additionally, also the inside of the protective tube inner part can be formed corresponding, especially parallel, to the outside of the protective tube inner part.

In an embodiment, the inside of the protective tube is, at least in the region of the closed, protective tube end, completely covered by the protective tube inner part. The protective tube inner part can thus be so embodied that it lies accurately fit on the inside of the protective tube.

In an additional embodiment, the closed, protective tube end is exposed, preferably during operation, to a measured material, and the protective tube inner part is fitted to the correspondingly formed, especially cupola-like, inside of the protective tube end. In order, for example, to prevent deposits, the end of the protective tube exposed to the measured material during operation is shaped, for example, spherically, ovally or bell shaped on its outside, at least in a subregion thereof. Additionally, also the inside of the protective tube can, at least in the region of the closed end of the protective tube, be shaped spherically, ovally or bell shaped. In departure therefrom, the shape of the protective tube on the outside can differ from the shape of the protective tube on the inside. Thus, for example, the protective tube can have on the outside in the region of the closed end a circularly cylindrical shape and on the inside a spherical, cupola-like shape.

In an additional embodiment, the protective tube inner part is composed of a heat conductive and/or electrically, or dielectrically, insulating material, especially a ceramic. The protective tube inner part can be either in direct thermal contact with the protective tube, for example, by lying against the protective tube, or indirect thermal contact, for example, via a heat conductive potting compound. The thermal contact with the process and the measured material is, in such case, among other things, dependent on the thermal conductivity of the material, of which the protective tube is composed. Additionally, the protective tube inner part can serve for the electrical or dielectric insulation and/or guiding of the conductor elements. In this way, on the one hand, for example, an electrical short circuiting of the conductor elements can be avoided; on the other hand, in the case of dielectric materials, then only lattice oscillations in the material provide heat transport, whereby, in turn, the thermal insulation of the process relative to the process environment is improved.

Additionally, the protective tube inner part can extend not only on the inside of the protective tube in the region of the closed end of the protective tube, and have a shape corresponding to the shape of the inside of the protective tube, but, instead, the protective tube inner part can extend in the protective tube over the entire length of the protective tube or at least over a subregion along the longitudinal axis of the protective tube and, in such case, have a shape corresponding to the inside of the protective tube, preferably the inside of the protective tube cover, i.e. lie in contact with the inside of the protective tube.

In an additional embodiment, the protective tube inner part has a metal or glass-ceramic coating, especially at least on the side facing in the installed state away from the protective tube, i.e. on its inside. The protective tube inner part can, moreover, make use of such a coating, at least in a subregion on its inside and/or outside. Preferably, however, essentially at least the inside and the outside of the protective tube inner part and especially preferably the entire protective tube inner part, is provided with such a metal or glass-ceramic coating. This coating serves for reflecting heat radiation at least in the infrared and/or in the non infrared region. Instead of metal or glass-ceramic, also other materials suitable for this purpose can be used. The coating reflects heat transferred from the protective tube, so that, first of all, the conductor elements, which are arranged between the protective tube inner part and the protective tube, experience a better thermal linking to the process, since the heat is, at least partially, not drained, but, instead, is reflected, and, second, the heat present in the process can not, or only in lessened measure, migrate into the process environment, since, through the reflection of at least a part of the heat radiation, the thermal insulation between the process and the process environment in the region of the protective tube, in which the protective tube inner part is placed, is improved.

The thermally reflecting coating can be placed, additionally, in a region on the inside of the protective tube, which region is not covered by the protective tube inner part, when the protective tube inner part is introduced into the protective tube. In this way, heat radiation otherwise penetrating into the interior of the protective tube can be reflected back into the process or into the measured material. Since, in the region in which the protective tube inner part covers the protective tube, no thermally reflecting coating is provided, heat can penetrate via the protective tube to the measuring point. Since the protective tube inner part, however, can also have at least one heat reflecting layer, at least a part of the heat radiation can be reflected back into the process.

In an additional embodiment, the protective tube inner part has guiding elements, which serve to arrange the conductor elements in a desired arrangement. Preferably, the conductor elements are introducible, especially with accurate fit, into the guiding elements. Alternatively thereto, instead of the protective tube inner part, the protective tube has the guiding elements. Moreover, the guiding elements for arranging the conductor elements can be provided both on the protective tube as well as also on the protective tube inner part. Preferred arrangements, in which the conductor elements are arrangeable by the guiding elements, such as, for example, arrangements in which the conductor elements run toward one another in a plane along the wall of the protective tube, especially from opposing directions, were already presented above.

In an additional embodiment, the guiding elements comprise at least one cavity, especially at least one groove milled in or otherwise formed in the protective tube inner part for accommodating the conductor elements. Instead of being in the protective tube inner part, the groove(s) can also be provided in the protective tube, wherein the protective tube inner part can then be used to position the conductor elements in the groove(s), for example, by covering the conductor elements with the protective tube inner part. The cavity can, in such case, have a shape and/or size corresponding to the shape of the conductor elements. Through the protective tube inner part, the conductor elements can then be pressed into the cavity and, respectively, enclosed therein. In order to avoid play of the conductor elements in the cavities, the cavities can supplementally be filled with a potting compound.

As regards the thermometer, the object is achieved by the feature that the thermometer has a protective tube and a protective tube inner part according to one of the preceding embodiments. By the improved, especially thermally insulating effect relative to the process environment provided by the protective tube inner part, also a thermometer with improved insulating properties can be produced. The thermometer can have, in addition to the protective tube, also a neck tube and/or a housing head. The neck tube is, in such case, in given cases, arranged between the protective tube and the housing head on the end of the protective tube facing away from the process, and is isolated from the protective tube by at least one lid. The housing head contains, for example, a measuring- and/or operating electronics, which is connected with the conductor elements and serves for processing a measurement signal transmitted via the conductor elements. The conductor elements can, in such case, be led via the neck tube from the protective tube into the housing head.

In an embodiment of the thermometer, the conductor elements form a sensor element or a number of sensor elements. For example, a first conductor element can be connected with a second conductor element via a so-called junction and form a thermocouple. The measurement signal or signals registered by the at least one sensor element can be transmitted via the conductor elements especially to the measuring- and/or operating electronics. The conductor elements can also serve for connecting the sensor element as well as for transmission of a measurement signal registered by the sensor element. The measuring point, which is determined by the position of the sensor element, is located preferably at the closed, protective tube end at a position between the conductor elements in a spatial section of the thermometer, in which the conductor elements are arranged by the protective tube inner part in a predetermined arrangement between the protective tube inner part and the protective tube.

In an additional embodiment of the thermometer, the sensor element is at least one thermoelement or at least one temperature dependent, resistance element. Also, a number of conductor elements and/or sensor elements can be provided. For example, a number of conductor elements can be provided, especially more than two, through which, then, a number of thermocouples are formed. For example, also a temperature dependent, resistance element, be present, which has a number of, especially two, three or four conductor elements, which serve as connection lines. These connection lines can then be arranged by the protective tube inner part as provided.

In an additional embodiment of the thermometer, the conductor elements are so arrangeable on the side of the protective tube inner part in the installed state facing the protective tube that the conductor elements are in thermal contact, especially direct thermal contact, with the protective tube. There can, thus, be a press fit, a loose fit, a transition fit or an interference fit according to DIN 7157 between the conductor elements and the protective tube inner part and/or the protective tube. In order to avoid an, in given cases present, free space for movement of the conductor elements in the fit, an option is, as already mentioned, to provide a potting compound, by which free space for movement is filled, whereby, especially in the case of a curing casting material, a stiffer arrangement of the conductor elements and an improved vibration resistance of the thermometer is obtained. In an additional embodiment of the thermometer, the conductor elements are, consequently, in thermal contact with the protective tube via the potting compound. The conductor elements can, at least partially and at least in the region, in which they are arranged in the protective tube inner part, be embedded in potting compound. The potting compound can thus, serve both for the thermal contacting as well as also for the securement of the conductor elements and/or the protective tube inner part in their installed positions.

In an additional embodiment of the thermometer, the protective tube inner part is connected with the inside of the protective tube by force interlocking, especially via spring force. Instead of or together with a mechanical connection via spring force, the protective tube inner part can also be secured to the protective tube by an adhesive. In such case, the mentioned potting compound can serve as adhesive. The force interlocking connection between the protective tube inner part and the protective tube can hold, as well, the conductor elements and, additionally, the measuring transducer (also referred to as the sensor or sensor element) connected to the conductor elements or formed by them.

In an additional embodiment of the thermometer, the conductor elements are arranged, by means of the protective tube inner part, between the wall of the protective tube and the wall of the protective tube inner part. The conductor elements are then, in the region, in which they are led by the protective tube inner part, arranged in a channel of its wall composed, on the one hand, of the wall of the protective tube inner part and, on the other hand, of the wall of the protective tube. The channel can, in such case, be formed from a cavity in the protective tube inner part and/or in the protective tube.

In an additional embodiment of the thermometer, the hollow space formed by the protective tube is evacuable or evacuated. Through evacuation of the hollow space of the protective tube, heat transfer is only still possible through heat radiation. Of advantage, in such case, furthermore, is when the conductor elements extend either freely, especially tension relieved, in the hollow space up to the protective tube inner part.

In an additional embodiment of the thermometer, within the protective tube are a number of lamellae, especially lamellae arranged parallel to one another. The lamellae, which are, for example, elongated thin disks, can serve to lessen thermal radiation present, in given cases, in the interior of the protective tube. For this purpose, the lamellae can be of a suitable material or coated with a suitable material, by which the heat radiation present, in given cases, in the hollow space of the protective tube is reflected. The lamellae can, in such case, be, for example, so arranged in the hollow space, especially in a spatial section, which adjoins, especially along the longitudinal axis of the protective tube, the spatial section in which the protective tube inner part is located in the installed state, that they extend through the protective tube along a cross section, especially a cross section perpendicular and/or parallel to the longitudinal axis of the protective tube.

In an additional embodiment of the thermometer, the protective tube is sealed on one of its ends by a lid, through which the conductor elements are led. Preferably, this is, in such case, the end of the protective tube facing, in the installed state, away from the process. Especially preferably, only the conductor elements are led through the lid, for example, into the neck tube or directly into the housing head. Since, according to the invention, no measuring insert is used with a solid body, within which the conductor elements are arranged, accordingly the openings in the lid for accommodating the conductor elements can be designed sufficiently small, i.e. preferably approximately the diameter of the conductor elements. There is, consequently, except for the protective tube, no connection between the process and the process environment for contributing to heat conduction between the process and the process environment. Therefore, the disadvantage of heat transfer brought about by the measuring inserts known from the state of the art is lessened. Instead, the present invention makes it possible to manufacture and apply protective tubes, as well as thermometers with such protective tubes, whose length essentially corresponds to their diameter.

In an additional embodiment, also at least the side of the lid facing the hollow space of the protective tube can be provided at least partially with the above-mentioned, thermally reflecting coating, which is composed, for example, of a metal or a glass-ceramic. If this is combined, for example, with the proposed lamellae and/or the thermally reflecting coating of the protective tube inner part and/or of the inside of the protective tube not covered by the protective tube inner part, an increasingly improved thermal insulation of the process environment relative to the process results.

Through the proposed invention, thus, not only the installation depth of the protective tube, i.e. its length, can be shortened, but also the thermal insulation between the process and the process environment is improved. Often, thermometers known from the state of the art as above mentioned have, on the side of the lid facing away from the process, either directly connected or connected via a neck piece, a so-called measurement transmitter, which contains the measuring- and/or operating electronics and is accommodated in the housing head. This measurement transmitter contains, among other things, electronic parts, whose purpose is processing of the measurement signal and which function faultlessly only up to a certain limit temperature and whose lifetime depends on the height of the average temperature, to which they are exposed.

In an additional embodiment of the thermometer, provided in the lid is a system for determining the pressure in the protective tube, or connection lines to such a system are provided in the lid. In this way, the pressure determining system means that leaking of the protective tube can be ascertained simply. Especially for the case, in which the hollow space formed by the protective tube is evacuated, a pressure change can be easily determined.

In an additional embodiment of the thermometer, the protective tube end has a cupola-like shape on its outside; it is, thus, for example, hemispherically, or bell, shaped.

In an additional embodiment of the thermometer, the protective tube and/or the protective tube inner part have/has on the outside, at least in the region of the protective tube end exposed during operation to the measured material, a metal coating, especially of gold or chrome. The coating can protect the protective tube, or the protective tube inner part, against scaling and discoloration. Additionally, the metal coating optimizes temperature transmission between protective tube and measuring insert. Additionally, the coating with chrome or gold can lessen the danger of wrong matching of protective tubes or measuring inserts, especially protective tube inner parts. Through the proposed coating of the protective tube, additionally, the clinging of measured material to the protective tube, and therewith corrosion, can be lessened.

As regards the container, the object is achieved by the features that the container has at least one thermometer according to at least one of the preceding embodiments and that the container has a receptacle for accommodating the thermometer, which receptacle is a part of a wall of the container. Thus, a container can be created, which has one or more protective tubes for accommodating, respectively, one or more thermometers. Through the low required installation depth of the proposed thermometer, the required protective tubes can, thus, be accommodated directly in the wall of the container or protruding on the inside of the container from the wall.

As regards the system, the object is achieved by the features that the system has a pouch or a container with an at least sectionally flexible wall for accommodating a measured material and a thermometer according to at least one of the preceding embodiments, wherein the thermometer is introducible into a receptacle of the pouch or of the container, so that it lies at least sectionally flushly against the pouch or the flexible wall of the container.

In an embodiment of the system, the receptacle includes, for securement of the thermometer, securement elements, by which the thermometer is connected or connectable, preferably force interlockingly connectable, with the pouch.

BRIEF DESCRIPTION OF THE DRAWINGS

The invention will now be explained in greater detail based on the appended drawing, the figures of which show as follows:

FIGS. 8 a), 8b), and 8c), is, in each case, a schematic representation of a cross section through a sensor tip of a thermometer.

DETAILED DESCRIPTION IN CONJUNCTION WITH THE DRAWINGS

Figure 1:
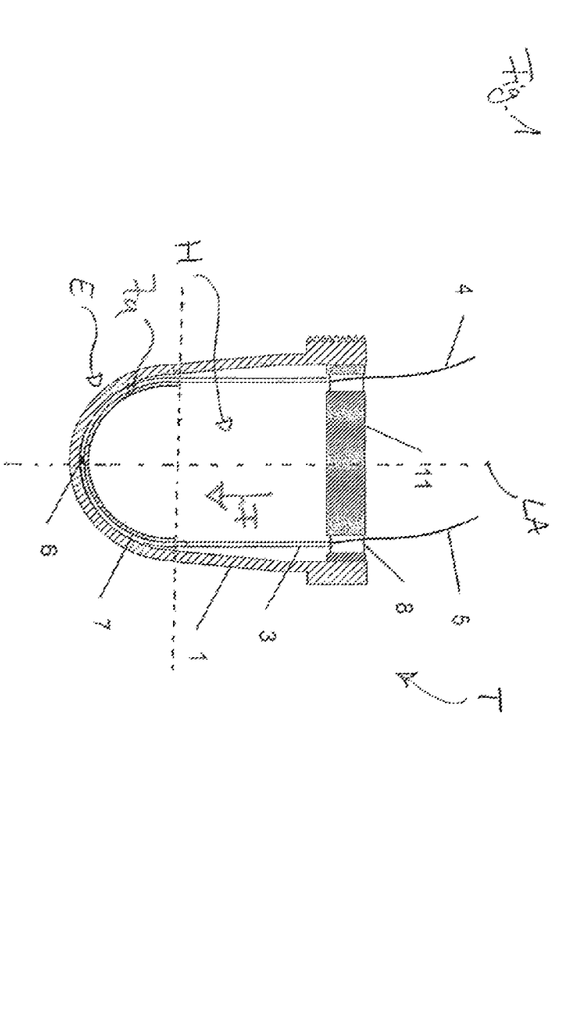
FIG. 1 is a schematic representation of a cross section through a thermometer with a protective tube and a protective tube inner part.

FIG. 1 shows a thermometer T composed of a protective tube 1, preferably of metal, ceramic or other suitable material and a cup-like, protective tube inner part 7 fitting the protective tube end E intended to face toward the medium, wherein the protective tube inner part 7 is composed of a heat conducting, dielectrically insulating, ceramic and has shape interlocking grooves for accommodating the thermocouple lead lines 4, 5 or the resistor leads 13, 16. The protective tube 1 can be produced, for example, by a deep draw method.

Additionally, the protective tube inner part 7 possesses a cavity, in which a thermocouple junction 6 or a resistance measuring element 17 is accommodated with good thermal contact to the protective tube inner part 7.

Figure 2:
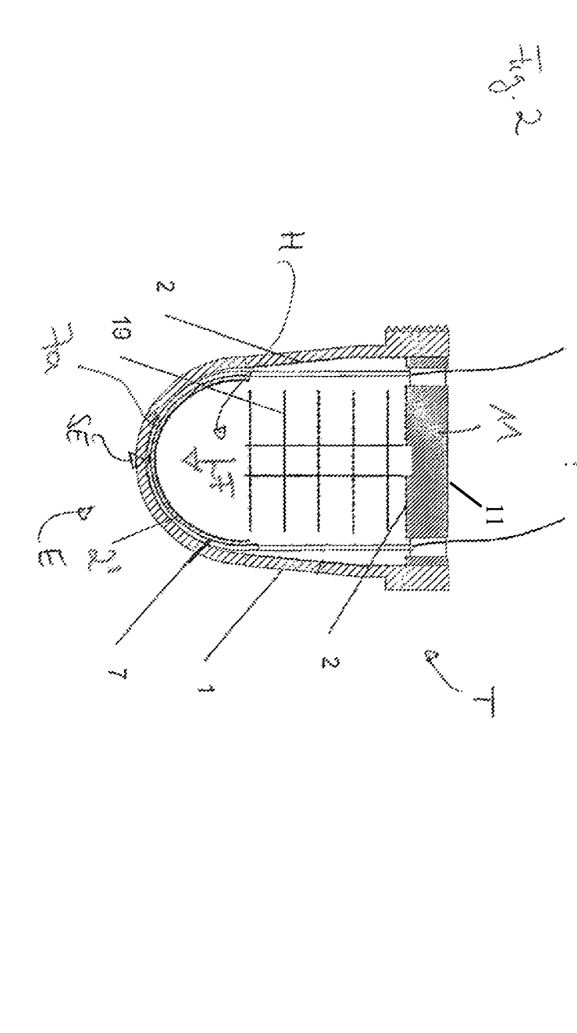
FIG. 2 is a schematic representation of a cross section through a thermometer with a protective tube and a protective tube inner part, wherein lamellae are provided supplementally in the hollow space formed by the protective tube.

The entire remaining hollow space H surrounded by the protective tube 1 can, as shown in FIG. 2, likewise have a metal coating 2 reflecting in the non-infrared- and/or infrared region. The volume surrounded diffusion tightly by the protective tube 1 and forming the hollow space H, is, as is known and described in Patent DE 4138460 C2, evacuable, but the present invention provides, through the cup-like construction of the protective tube inner part 7 and the external, or process-side, protective tube end E, coupled with good thermal contacting of the embedded sensor element SE as well as also embedded conductor elements, which serve for connecting the sensor element SE, advantages, through which the measuring characteristics of the thermometer T is improved, while avoiding the holder of transparent ceramic with disadvantageous thermal drain characteristics described, for example, in patent DE 4138460 C2.

Figure 5:
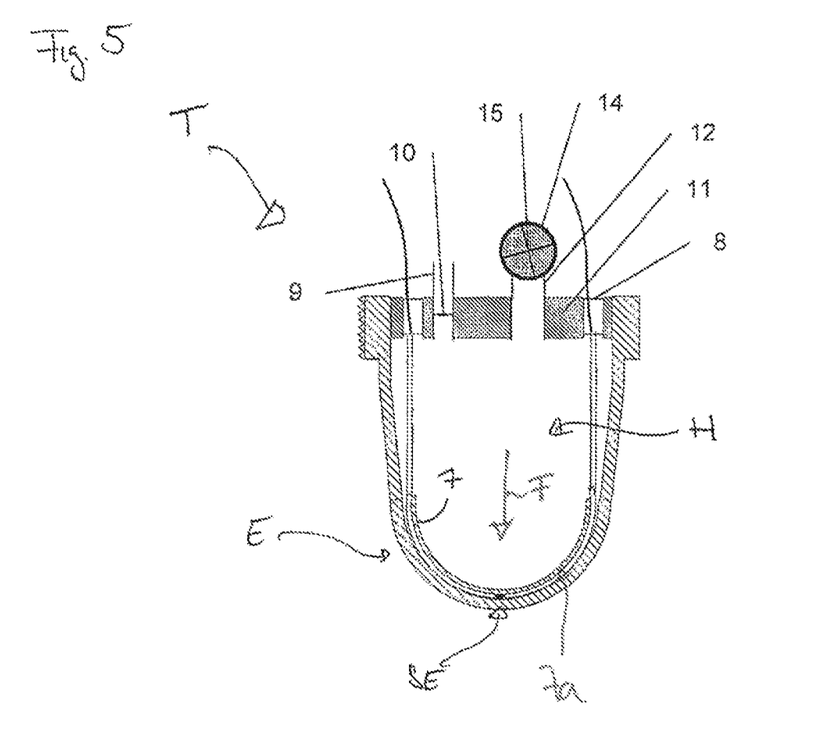
FIG. 5 is a schematic representation of a cross section through a thermometer with a protective tube and a protective tube inner part, wherein supplementally a burst disk, or a bleed-off valve, and a diaphragm manometer are provided in the lid of the protective tube.

The relatively low heat capacity of the wall of the protective tube 1 combined with the good thermal embedding of the at least one sensor element SE and the conductor elements 4, 5 serving as connection lines and the heat transfer (under standard pressure by means of gas-heat conduction and gas-convection) absent in the vacuum, wherein the thermally reflecting coating 2 limits the radiative effects present in the vacuum, leads to a rapid response of the sensor elements corresponding to the measured substance temperature, wherein a sensor inertia otherwise brought about by internal heat transfer effects is prevented. Due to these advantageous properties, an essentially more compact, protective tube structure can be created, wherein especially the at least 6-times the protective tube diameter for the installation depth for preventing thermal drain effects does not need to be provided, so that, at equal protective tube diameter, smaller, less process flow disturbing, installation depths are possible. The smaller installation depth advantageously contributes to reducing flow resistance, wherein smaller mechanical loadings occur in the case of a fluid measured material M and, thus, additional reinforcement, or means for providing a sufficient vibration resistance can be avoided. In the case of the protective tube 1 evacuated in the nominal operating state, upon occurrence of leakage, the measured material M first penetrates into the interior of the protective tube 1, wherein simultaneously an unsealed display occurs by means, for example, of the diaphragm manometer 14, which displays, for example, the vacuum loss, as shown in FIG. 5. If, after this warning phase, in the case of which measured material M has still not exited to the environment, leakage is still occurring, the further, for example, pressure driven penetration of the measured material M is displayed by means of an overpressure display on the diaphragm manometer 14. Only subsequently might the measured material M exit from the protective tube 1 via a burst disk 10, or via a bleed-off valve, and this discharge can then be guided via a drain tube connected to nozzle 9 to an appropriate destination for disposal.

FIG. 1 shows a cross section through a thermometer T with the embedded thermocouple leads 4, 5 and the thermocouple junction 6, wherein the thermocouple junction 6 is located in a plane with the thermocouple leads 4, 5, whereby an advantageous mechanical and thermally conducting fitting with the protective tube inner part 7 is created. The pressure- and vacuum tight feedthroughs 8 for accommodating the thermocouple leads 4, 5 primarily prevent escape of measured material M in the case protective tube leakage. Suitable feedthroughs are, for example, glass feedthroughs, which are compatible especially for accommodating platinum/platinum-rhodium thermocouple leads 4, 5.

FIG. 2 shows, additionally, a cross section through the protective tube 1 of a thermometer T with cascaded shield lamellae 19, which effectively lessen thermal radiation in the vacuum. In a non-evacuated, gas filled space, thermal convection or heat conduction in solid bodies dominates. Each reflecting shield lamella 19 acts by means of the residually absorbed radiation fraction on its part as an emitter, wherein, at maximum, in each case, about half is given off toward the housing head (not shown) and therewith an overall weakening results in the form of a decreasing geometric series. The shield lamellae 19 can, in such case, be of a suitable material or can be provided with a metal and/or glass-ceramic coating 2. Additionally, as shown in FIG. 2, this coating 2 can be provided at least in a subregion of the inside of the protective tube 1 and on a lid 11 of the protective tube 1. Furthermore, also the inside of the protective tube inner part 7 can be provided with this coating 2'. The protective tube inner part 7 can, however, also be provided with the coating 2 on its outside, at least in the region, in which the conductor elements 4, 5 and/or the sensor element SE are arranged.

FIG. 2 also shows guide elements 7a in the protective tube inner part which serve to arrange the conductor elements in a desired arrangement. As seen in the figure, the conductor elements 4, 5 are introducible with an accurate fit into the guiding elements. Additionally, the guiding element can comprise at least one cavity, especially at least one groove milled in or otherwise formed in the protective tube inner part for accommodating the conductor elements. The protective tube inner part is connected with the inside of the protective tube by force interlocking, e.g., held in place against, for example, via a spring force F exerted by the protective tube inner part.

Figure 3:
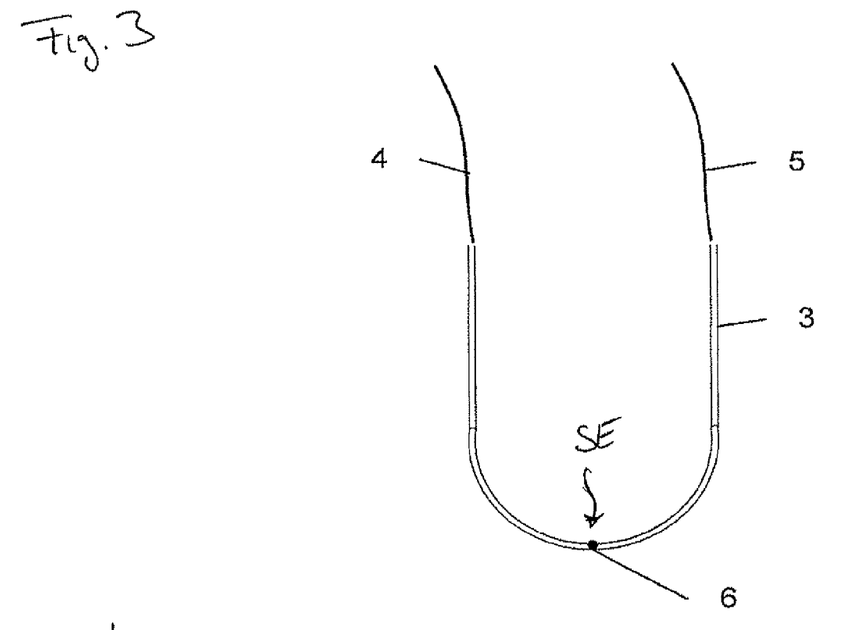
FIG. 3 is a schematic representation of a cross section through a protective tube inner part with a thermocouple.

FIG. 3 shows a first thermocouple lead 4 and a second thermocouple lead 5, which are led together in a plane, embedded in the, e.g. mineralized, jacket insulation 3, to the thermocouple junction 6 and which, in contrast to the usually used thermometer sensor tip configuration, have, due to the isothermal leading between the protective tube 1 and the protective tube inner part 7 (not shown in the drawing), no disturbing temperature gradients and, moreover, utilize an advantageous, stable, mechanical, vibration resistant and isothermal, stress free embedding, combined with favorable, quickly responding, measuring characteristics.

Figure 4:
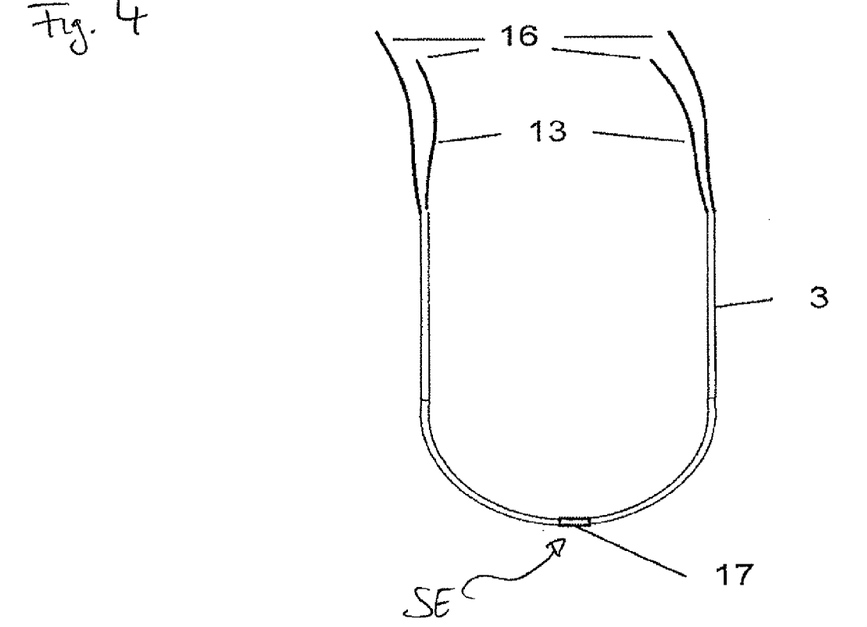
FIG. 4 is a schematic representation of a cross section through a protective tube inner part with a temperature dependent, resistance element.

FIG. 4 shows resistor leads 13 for 2-conductor connections, or resistor leads 16 for 4-conductor connections, which are embedded in, e.g. mineralized, jacket insulation 3 and are connected in 2-conductor-, or 4-conductor connection technology to a temperature dependent, resistance measuring element 17, wherein, due to the isothermal leading between the protective tube 1 and the protective tube inner part 7 (not shown in the drawing), no disturbing temperature gradients arise and an advantageous, highly stable, mechanical and thermal embedding is created, combined with favorable, quickly responding, measuring characteristics.

Due to the protective tube inner part 7 (not shown in the drawing), the thermocouple leads 4, 5, or the resistor leads 13, 16 can be arranged corresponding to the arrangements in FIGS. 3 and 4, and, thereby, the named advantages achieved.

FIG. 5 shows a longitudinal section through the protective tube 1 of a thermometer T with an evacuating- and drain tube 9 and a therein integrated, burst disk 10. Instead of the burst disk 10, however, also a bleed-off valve can be integrated in the tube 9. The bleed-off valve activates upon the reaching of the limit operating pressure, for which the protective tube 1 is designed. The outwardly pointing end piece of the evacuation tube accommodates a drain tube 9, whereby the measured material can be drained safely without discharge into the environment in the case of an exceeding of the nominal operating pressure. Serving for display of the operating state is the modified diaphragm manometer 14, which, instead of a usual dial display, uses, for example, reflecting disk elements, which makes well visible collapse of vacuum in the protective tube-(with, for example, an orange dyed, reflecting segment) and, moreover, serves for providing visible indication of prohibited pressure loadings (with, for example, a red dyed, reflecting segment). The thermometer T shown in FIG. 5 can, analogously to the thermometer T of the example of an embodiment in FIG. 2, have a metal or glass-ceramic coating 2.

Figure 6:
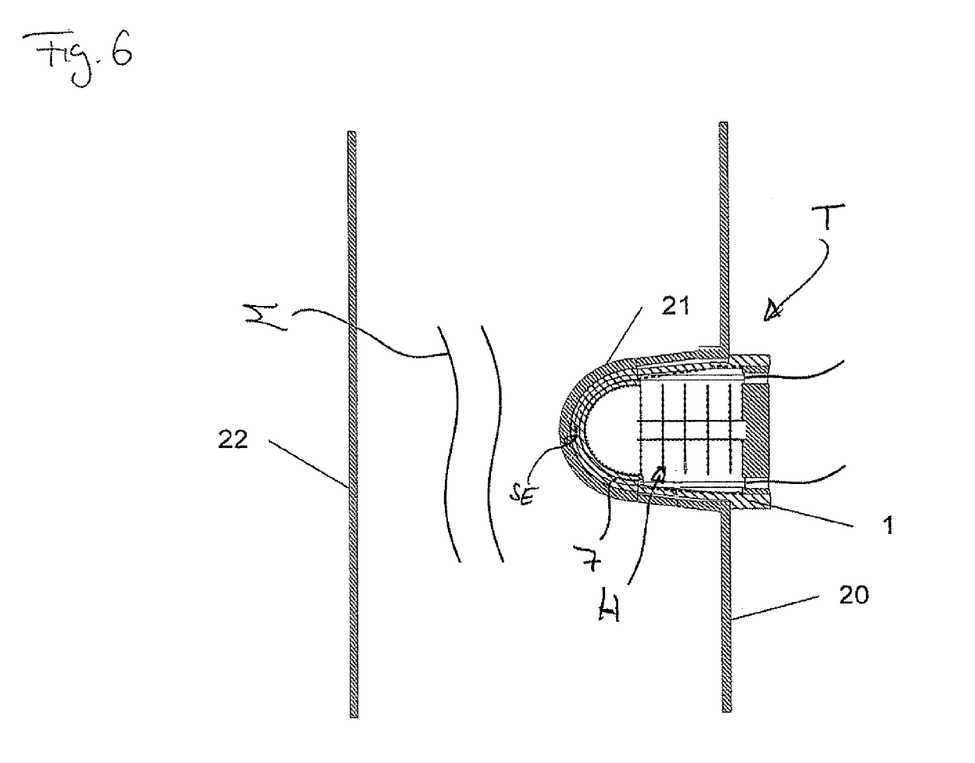
FIG. 6 is a schematic representation of a cross section through a container with a wall, wherein a protective tube with small installation depth is a component of the wall of the container.

FIG. 6 shows a pipeline 20, or a container with a rear wall 22, which with good thermal contact receives a thermometer T via a fitted wall depression 21. Instead of the wall depression 21 first extending conically and terminating with a spherical head as shown in FIG. 6, alternative forms of embodiment include, for example, a cylindrical depression, a prismatic depression 21, a spiraling screw part and/or, for example, a corkscrew-like depression. The wall depression 21 serves, in such case, as protective tube relative to the measured material M in the container with the rear wall 22. The thermometer T includes a protective tube 1, which is insertable into the protective tube-counterpart, i.e. the wall depression 21, serving as receptacle for the protective tube 1 of the thermometer T. This protective tube-counterpart serves thus as a receptacle and is composed advantageously of the pipe-, or container material.

A feature of the embodiment shown in FIG. 6 is good thermal contact, coupled with avoidance of a disturbance susceptible, protective tube seal with an always threatening tendency to leak. Additionally, the already present, measured substance- and process-specifically designed, abrasion- and aggression resistant pipe-, or container material is utilized as a supplemental protective tube. The thermometer T shown in the forms of embodiment of FIG. 1, 2 or 5 can be applied in such a receptacle composed, for example, of a wall depression 21.

Figure 7:
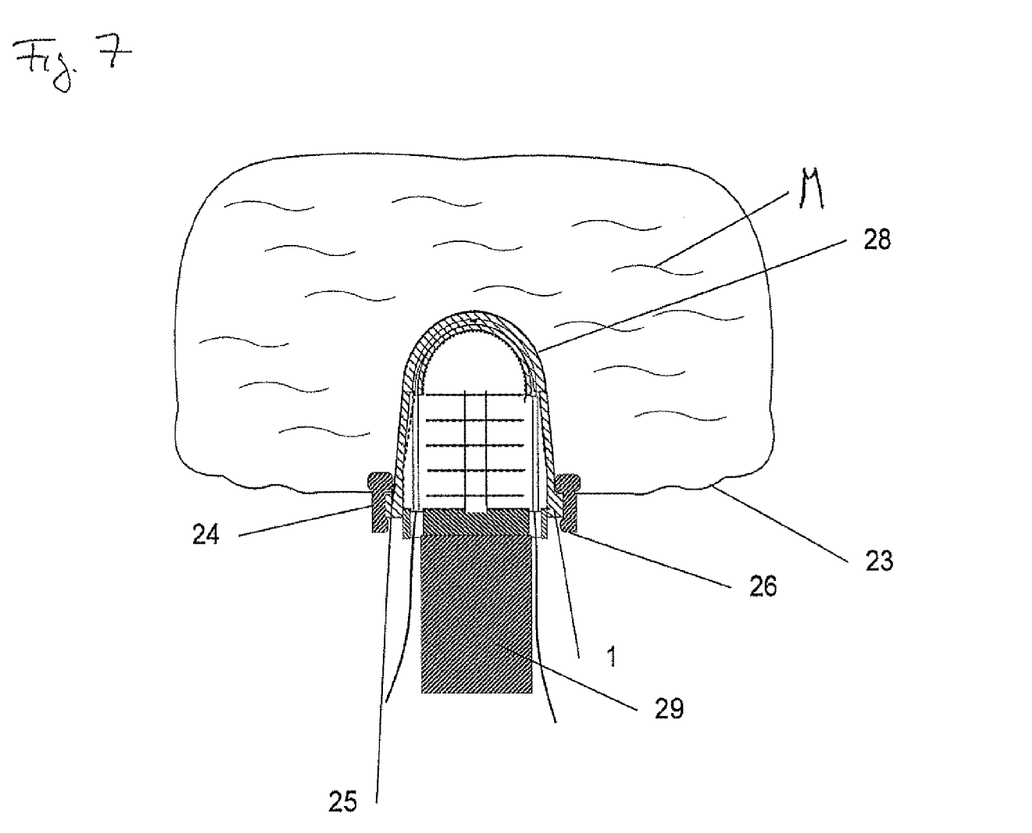
FIG. 7 is a schematic representation of a cross section through a pouch with a flexible wall, wherein holding means are provided, by means of which a thermometer is secured to the pouch.

FIG. 7 shows a plastic bag, or pouch, 23, which is filled with the measured material M, whose temperature is measured by means of the thermometer T using, for example, a conically formed, protective tube 1. Lying flushly against a pouch holder 24, e.g. an annular pouch holder 24, integrated in the plastic pouch 23 is a segment 28 of the plastic pouch 23, wherein the annular pouch holder 24 has a stop edge 25, against which the protective tube 1 lies and can be inserted into the annular snap-in seat 26 by means of the holder 29. The holder 29 can be implemented with different types of securement, such as, for example, screwed connections, clips, snap-in seats. The shape of the protective tube 1 prevents air inclusions as the protective tube is introduced into the segment 28, so that the temperature of the measured material M can be determined faultlessly. Instead of the conical shape, the protective tube 1 can also have a hemispherical shaped, oval, bell shaped or other suitable shape for avoiding air inclusions between the protective tube 1 and the segment 28 of the container 23.

Also, in the case of the example of an embodiment shown in FIG. 7, improved thermal contact is achieved as compared with the state of the art. Additionally, the thermometer T can be rapidly exchanged, wherein no loss of sterility occurs, a feature important, for example, in the case of pharmaceutical or biotech applications. Thus, in the case of the embodiment of FIG. 7, the thermometer T does not come in contact with the measured material M.

Additionally, a cost-saving results, since, therefore, neither thermometer nor pouch nor pouch contents need be changed. Instead of a thermometer, also some other or additional, measured value transducer can be provided for determining other parameters, such as, for example, ultrasound density, infrared, and optical, spectroscopic parameters. In accordance with the measuring principle of the respective measuring transducer, the plastic pouch material can be selected, or at least the material present in the subregion, in which the thermometer T or some other measuring transducer is seatable. Preferably, a thermometer T of one of the embodiments disclosed herein, especially an embodiment according to one or more of FIGS. 1, 2 and 5, is seated, or inserted, in the holder 29.

Figure 8A:
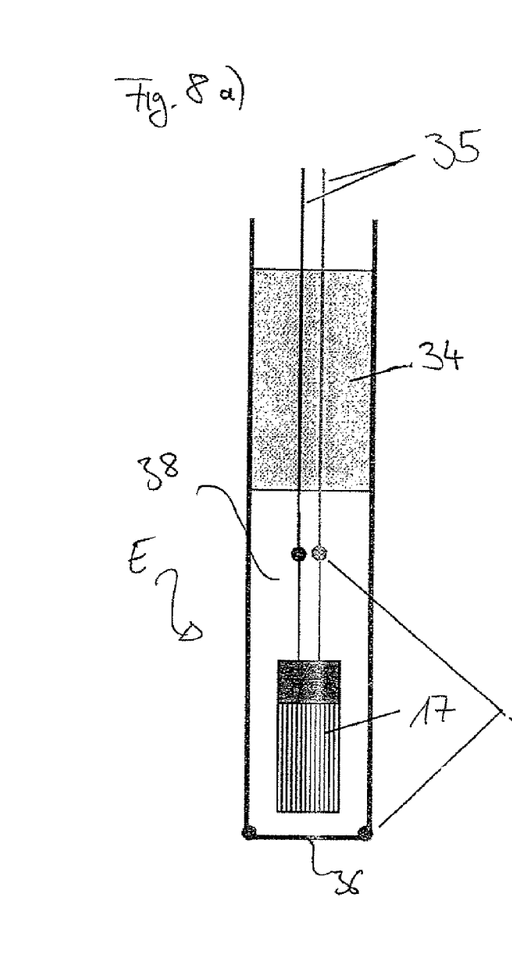

FIG. 8 a) shows schematically a cross section through a sensor tip of a thermometer T. The sensor tip is composed, in such case, essentially of the process-side, sensor end F, in which a temperature dependent sensor element 17 is arranged. The protective tube 1 includes, on the process-side, sensor end E (in the case of which involved can be especially a protective tube end), an end plate 36, which is connected with the remainder of the protective tube 1 via a joint 33, such as e.g. a weld. Introduced into the protective tube 1 in a connection cable 34, for example, a mineral insulated connection cable 34, are connection wires 35. The connection wires 35 are connected with the temperature dependent sensor element 17 in the region of the sensor tip via joints 33. The temperature dependent sensor element 17 is, in such case, along with the joints 33 between the connection wires 35 and the temperature dependent, resistance element 17, embedded in a fill 38. The fill 38 is composed preferably of a thermally conductive material, so that the temperature dependent sensor element 17, for example, a temperature dependent, resistance element, has a good thermal linkage to the process.

Figure 8B:
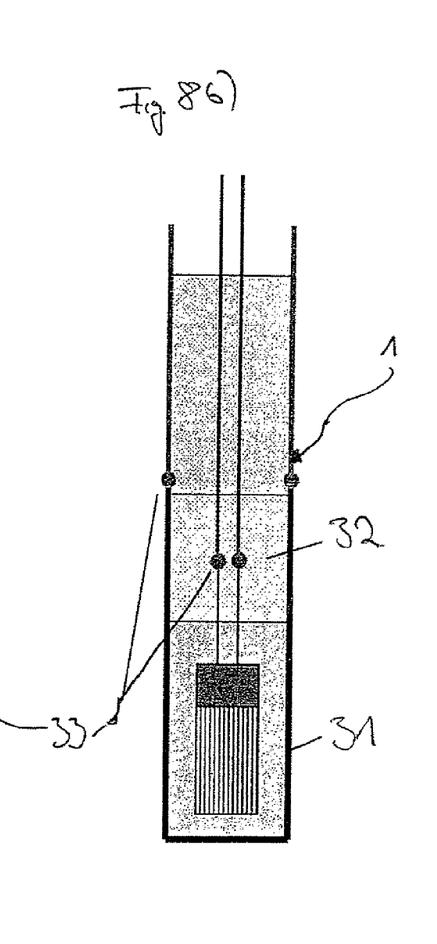

FIG. 8 b) shows a cross section through a sensor tip of a thermometer T with another construction. The sensor tip is composed, in such case, essentially of a cartridge 31, in which the temperature dependent sensor element 17 is arranged. The cartridge 31, especially a cylindrical, cartridge 31, is connected via a joint 33 with the remainder of the protective tube 1, especially a cylindrical, protective tube 1. The connection wires 35 of the thermometer T in FIG. 8 b) are connected e.g. within a ceramic, molded part 32, with the temperature dependent sensor element 17, or its connection lines. In such case, the connection wires 35 and the connection lines are connected in the region of the ceramic, molded part 32 via joints 33 electrically conductively with one another. As in FIG. 8 a), the temperature dependent sensor element 17 is embedded in a fill 38. The fill 38 extends within the cartridge 31 advantageously up to the ceramic, molded part 32, which can be arranged, at least partially, also in the cartridge 31.

Figure 8C:
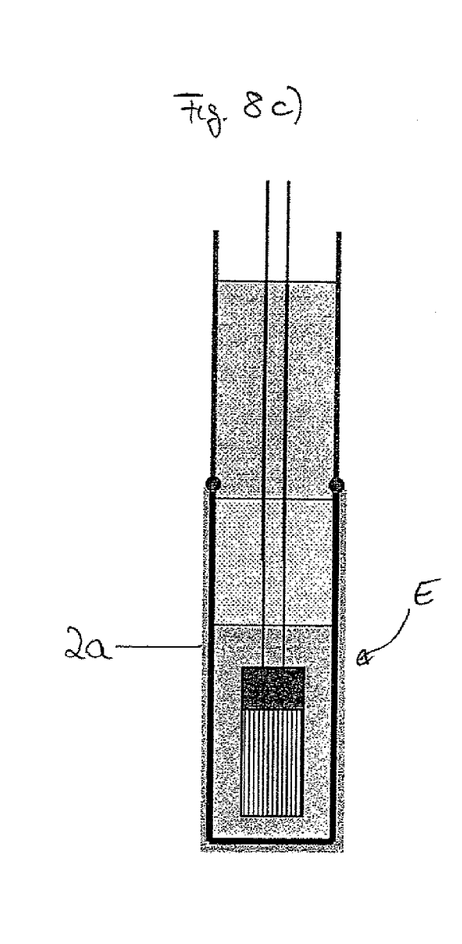

FIG. 8 c) shows a sensor tip of a thermometer T with a construction of FIG. 8 b) supplemented via a coating 2a, advantageously e.g. of gold-, or chrome. The coating 2a can, in such case, be applied on the outside, at least in a subregion of the sensor tip. In the example of an embodiment of FIG. 8 c), the gold-, or plating 2a is placed on the outside of the cartridge 31, but it can, however, also extend onto the adjoining protective tube 1. The coating 2a can, in such case, be applied, for example, using a galvanic process. This coating 2a can, additionally, be applied, at least in a subregion, on the inside of the sensor tip, especially of the cartridge 31 and/or of the protective tube 1. The cartridge 31 can be produced, for example, by a deep draw-, or injection molding or sinter process, e.g. from stainless steel, plastic or ceramic. The shown sensor tips in FIGS. 8 a), b), c) can also be part of a measuring insert and be placed in a further protective tube, for example, in a wall depression 21 of a container.

By the gold-, or chrome plating 2a of the sensor tip, especially of the cartridge 31, a mix-up of thermometers T or measuring inserts with otherwise equal mechanical properties can be prevented. Additionally, in this way, thermometers T can be distinguished as regards their manufacturing process and the therewith connected, different measuring characteristics. The gold- and/or chrome plating 2a, additionally, prevents scaling and/or discoloration of the protective tube 1, or of the cartridge 31.

Additionally, in the case, in which such a thermometer T is placed in a further protective tube, the thermal linking to the other protective tube can be optimized. Through the gold- and/or chrome plating 2a, furthermore, the corrosion and/or clinging tendency of such a thermometer T used as measuring a insert can be minimized.

Instead of the cylindrical sensor tip shown in FIG. 8 a), b), c), especially the cylindrical cartridge 31, it is also possible to use a sensor tip, or a cartridge 31, which has another shape on the process-side end E, in which the temperature dependent sensor element 17 is arranged, especially a round, spherical, bell or oval shape.

Additionally, instead of the shown cylindrical, ceramic, molded part 32, a protective tube inner part 7 as shown in FIGS. 1, 2, and 5 can be used, especially a cup shaped, protective tube inner part. Thus, especially, a thermometer T can be provided, which has a construction according to one of those in FIG. 1, 2 or 5, and which has on the outside, at least in a subregion of the protective tube 1, especially in the region of the sensor tip, i.e. in the region of the protective tube end E, a corresponding coating 2a. As temperature dependent sensor element 17 e.g. also a thermoelement, e.g. a thermocouple, can be used for determining the temperature. Then, in given cases, the ceramic, molded part 32 and/or the welding of the connection wires 35 in the region of the sensor tip can be omitted.

LIST OF REFERENCE CHARACTERS 1 protective tube
2 coating
2a gold-, or chrome plating
3 coating
4 thermocouple lead
5 thermocouple lead
6 thermocouple junction
protective tube inner part for accommodating thermocouple leads
8 feedthrough for accommodating thermocouple leads
9 fitting for evacuating- and drain tube with burst disk or. bleed-off valve
10 burst disk
11 assembly lid, diffusion resistant
12 connection for diaphragm manometer
13 temperature dependent resistance element with 2-wire connection
14 modified diaphragm manometer
15 reflective display coating
16 temperature dependent resistance element with 4-wire connection
17 resistance measuring element
19 reflecting disk-shaped lamellae 20 pipeline wall, container wall
21 conically fitted wall depression
22 rear wall
23 plastic pouch
24 pouch holder
25 stop edge for protective tube receptacle
26 snap-in seat
27 measured medium
28 adjoining segment of the plastic pouch
29 holder
M measured material
E protective tube end
H hollow space
T thermometer
SE sensor element
31 cap
32 ceramic, molded part
33 joint
34 jacket insulation
35 connection wires for a temperature dependent, resistance element
36 end plate
38 fill

The invention claimed is:

1. A thermometer comprising a protective tube inner part for insertion into a protective tube, wherein:
   the protective tube inner part serves for arranging conductor elements;
   the protective tube inner part is matched to the shape of the inside of said protective tube in the region of a closed, protective tube end; and
   the protective tube inner part serves to arrange said conductor elements on the side of the protective tube inner part facing said protective tube in the installed state,
   said protective tube is sealed on one of its ends by a lid,
   and wherein a system for determining pressure in said protective tube is provided in said lid, or connecting lines to such a system are provided in said lid.

2. The thermometer as claimed in claim 1, wherein:
   said conductor elements form a sensor element or a number of sensor elements.

3. The thermometer as claimed in claim 2, said sensor element comprises at least one thermoelement or at least one temperature dependent, resistance element.

4. The thermometer as claimed in claim 1, wherein:
   said conductor elements are so arrangeable on the side of the protective tube inner part facing, in the installed state, said protective tube that said conductor elements are in thermal contact with said protective tube.

5. The thermometer as claimed in claim 1, wherein:
   the protective tube inner part is connected with the inside of said protective tube force interlockingly, wherein the protective tube inner part is held in place against the inside of said protective tube via spring force.

6. The thermometer as claimed in claim 1, wherein:
   said conductor elements are in thermal contact with said protective tube via a potting compound.

7. The thermometer as claimed in claim 1, wherein:
   said conductor elements are arranged by means of the protective tube inner part between the wall of said protective tube and the wall of the protective tube inner part.

8. The thermometer as claimed in claim 1, wherein:
   the hollow space formed by said protective tube is evacuated or evacuable.

9. The thermometer as claimed in claim 1, wherein:
   said protective tube end has a cupola-like shape on its outside.

10. The thermometer as claimed in claim 1, wherein:
    a plurality of lamellae are arranged, within said protective tube.

11. The thermometer as claimed in claim 1, wherein:
    said protective tube and/or the protective tube inner part have/has on the outside, at least in the region of said protective tube end exposed during operation to the measured material, a coating, wherein said coating is gold or chrome.

12. A container having at least one thermometer as claimed in claim 1, wherein:
    a receptacle is provided, into which the thermometer is insertable, wherein the receptacle is a component of the wall of the container.

13. A system comprising a pouch or a container having an at least sectionally flexible wall for accommodating a measured material and a thermometer as claimed in claim 1, wherein:
    the thermometer is introducible into a receptacle of the pouch or of the container, so that it at least sectionally lies flushly against the pouch, or against the flexible wall of the container.

14. The system as claimed in claim 13, wherein:
    the receptacle has, for the securement of the thermometer, securement elements, by which the thermometer is connected or connectable, preferably force interlockingly, with the pouch, or the flexible wall of the container.

15. The thermometer as claimed in claim 1, wherein the protective tube inner part has a cup-like shape.

16. The thermometer as claimed in claim 1, wherein the protective tube inner part is matched to a correspondingly formed inside of said protective tube end.

17. The thermometer as claimed in claim 1, wherein:
    the protective tube inner part comprises a heat-conductive and/or electrically insulating material, wherein said insulating material is a ceramic.

18. The thermometer as claimed in claim 1, wherein:
    the protective tube inner part has a metal or glass-ceramic coating at least on the side facing in the installed state away from the protective tube.

19. The thermometer as claimed in claim 1, wherein:
    the protective tube inner part has guiding elements, which serve to arrange said conductor elements in a desired arrangement; and
    wherein said conductor elements are introducible with an accurate fit into said guiding elements.

20. The thermometer as claimed in claim 19, wherein:
    said guiding elements comprise at least one cavity in the protective tube inner part for accommodating said conductor elements.

21. A thermometer comprising a protective tube inner part for insertion into a protective tube, wherein:
    the protective tube inner part serves for arranging conductor elements;
    the protective tube inner part is matched to the shape of the inside of said protective tube in the region of a closed, protective tube end; and
    the protective tube inner part serves to arrange said conductor elements on the side of the protective tube inner part facing said protective tube in the installed state,
    wherein a plurality of lamellae are arranged in a hollow space of said protective tube and serve to lessen thermal radiation present in the interior of the protective tube.

* * * * *